3,770,868
PROCESSING OF MANGANESE ORES
Dominicus Adrianus Johannes Swinkels and Peter Hansen Scaife, Charlestown, New South Wales, and John Barry Lean, North Lambton, New South Wales, Australia, assignors to The Broken Hill Proprietary Company Limited, Newcastle, New South Wales, Australia
Filed Dec. 13, 1971, Ser. No. 207,279
Claims priority, application Australia, Dec. 30, 1970, 3,605/70
Int. Cl. C01g 45/02; H01b 1/08
U.S. Cl. 423—50                  6 Claims

ABSTRACT OF THE DISCLOSURE

Synthetic manganese dioxide is produced by leaching a manganese dioxide ore with hydrochloric acid in the presence of manganese chloride or magnesium chloride, precipitating manganese dioxide using chlorine liberated in the leaching step, and hydrolysing the liquid phase remaining after separation of the product to regenerate a base used for pH control earlier in the process and the acid used in the leaching step.

---

The present invention relates to processes for the treatment of manganese-containing materials, such as manganese dioxide ores, to produce finely divided synthetic manganese dioxide for a variety of end uses, including dry cell battery manufacture, ferrite manufacture and pigments.

Synthetic manganese dioxide for such uses is currently made by processes involving chemical or electrochemical oxidation. In both types of process, manganese is taken into solution by reduction roasting of the dioxide ore followed by leaching in a suitable acid, generally sulphuric acid, and the product prepared by chemical or electrochemical oxidation. Such processes require a wasteful reduction roast and suffer from the following additional disadvantages; (a) for electrolytic deposition product finishing is complicated by the physical form of the product, and (b) for chemical precipitation processes low value by-products are produced and expensive chemicals consumed.

For manganese ores containing a high proportion of manganese as the dioxide, the problem of producing battery active manganese dioxide can be stated as being one of altering the crystal structure of the manganese dioxide in the ore to the gamma-rho structure, which has high battery activity while at the same time controlling the surface area, surface groups, density and impurity contents. For the other uses, the problem is one of controlling impurity levels and state of subdivision. The control of surface groups, density and impurity contents implies a solution process, and since there is no overall change in the oxidation state of manganese, a minimum amount of take-up oxidant, in either chemical or electrochemical form, should be required.

The object of the present invention is to provide as improved process for the production of synthetic manganese dioxide which overcomes the above disadvantages of the standard processes, and thereby to provide a process which requires minimal oxidant.

A further object of the invention is to provide a cyclic process for the production of synthetic manganese dioxide which requires little or no addition of chemicals to maintain the process in operation.

Broadly, in accordance with the present invention, there is provided a cyclic process for preparing synthetic manganese dioxide which comprises the steps of:

(A) leaching a manganese-containing material with hydrochloric acid to form a solution of manganese chloride;

(B) adding a base to said manganese chloride solution to neutralise unreacted hydrochloric acid from step (A);

(C) removing deleterious impurities from said manganese chloride solution;

(D) treating said manganese chloride solution with chlorine while maintaining the pH thereof at a value above 0.5 by addition of a base to thereby precipitate manganese dioxide;

(E) separating the precipitated manganese dioxide from the liquid phase; and (F) subjecting the liquid phase from step (E) to a hydrolysis reaction at a temperature of at least 400° C. to regenerate the base used in steps (B) and (D) and the hydrochloric acid used in step (A), the regenerated base being recirculated for use in steps (B) and (D) and the regenerated hydrochloric acid recirculated for use in step (A).

In accordance with a preferred embodiment of the invention the starting material is a manganese dioxide ore, the leaching of which with hydrochloric acid produces at least a portion of the chlorine used in step (D).

The leaching step used in the processes of the present invention is preferably one which is carried out in the presence of inert chlorides. Inert chlorides are defined in this context as soluble chloride which, in themselves, do not appreciably leach manganese-containing materials such as manganese dioxide ores. The addition of inert chlorides during the hydrochloric acid leaching of the starting material greatly increases the rate of leaching as illustrated in the accompanying FIG. 1 which is a graph showing the percentage of manganese extracted against time under different conditions of leaching. In each of the experiments conducted, 100 grams of −30 +60 mesh (British Standard Sieve Series) manganese dioxide ore was subjected to hydrochloric acid leaching at a temperature of 80° C. while being stirred at a speed of 150 r.p.m. The hydrogen ion concentration was 5 gram ions per litre in each case and the chloride ion concentration was 5 gram ions per litre for curve A (i.e. no added chlorides); 7 gram ions per litre for curve B (2 gram ions of chloride added as magnesium chloride); 8 gram ions per litre for curve C (3 gram ions of chloride added as magnesium chloride); and 9 gram ions per litre for curve D (4 gram ions of chloride added as magnesium chloride). As can be readily seen from FIG. 1 the addition of inert chlorides greatly increases the rate of leaching of the manganese dioxide ore, for example, after 180 minutes hydrochloric acid with no added chlorides had extracted only about 50% of the ore whereas the hydrochloric acid to which an additional 4 gram ions per litre of chloride ion had been added (curve D) had extracted about 97% of the ore.

The preferred embodiment of the present invention, comprises a process with three main stages. A preferred method of carrying out this embodiment will now be described in detail. In this preferred method the three main stages of the process are:

(1) A leaching stage in which the manganese dioxide ore is leached with hydrochloric acid at temperatures of from room temperature to the boiling point, preferably at temperatures of from 50° to 100° C., to form manganese chloride in solution together with gaseous chlorine according to the equation:

$$MnO_2 + 4HCl \rightarrow MnCl_2 + Cl_2 + 2H_2O$$

This reaction was the basis of the Weldon process for converting hydrochloric acid to chlorine in the 1860's and the rate of reaction thereof is dependent upon chloride ion concentration, temperature, hydrogen ion concentration, manganese ion concentration, particle size and grade of the ore, and the speed of stirring.

As described above the reaction rate in this stage can be greatly increased by the addition of inert chlorides such as magnesium chloride, sodium chloride, manganese chloride and the like. As explained in more detail hereinafter, the inert chloride used is preferably magnesium chloride or manganese chloride.

(2) A precipitation stage in which chlorine generated in stage (1) together with make-up chlorine is used to precipitate manganese dioxide from the manganese chloride solution resulting from stage (1). This stage is carried out at a pH above 0.5, preferably between 0.5 and 3, the pH being controlled by the addition of "active" magnesia or magnesium hydroxide, according to the equations:

$$MnCl_2 + 2MgO + Cl_2 \rightarrow MnO_2 + MgCl_2$$

or $$MnCl_2 + 2Mg(OH)_2 + Cl_2 \rightarrow MnO_2 + 2MgCl_2 + 2H_2O$$

If a battery grade product is required, this stage can be improved by the addition of finely divided manganese dioxide to the reaction mixture as nuclei for the precipitation process. The practice also assists in the control of apparent density of the resultant product. Also, carbon black can be used as a seed material during the precipitation in order to improve the battery performance of the product. A further improvement in this stage can be obtained by adding carbon black in the correct proportion for dry cell manufacture, to the precipitated manganese dioxide while this is still in suspension under vigorous stirring. This results in the production of a homogeneous mixture of battery grade manganese dioxide and carbon black and avoids mixing problems which are encountered if the manganese dioxide and carbon black are mixed in the dry state.

(3) A high temperature metal chloride hydrolysis reaction, preferably a spray roasting stage, wherein "active" magnesia or magnesium hydroxide, and hydrochloric acid are regenerated from the filtrate liquor resulting from stage (2) according to the equations:

$$MgCl_2 + 1H_2O \rightarrow MgO + 2HCl$$

or $$MgCl_2 + 2H_2O \rightarrow Mg(OH)_2 + 2HCl$$

Make-up quantities of hydrochloric acid and of "active" magnesia or magnesium hydroxide are provided by spray roasting magnesium chloride added to stage (1) or (3).

The invention will now be more fully described in relation to FIGS. 2 to 4 of the accompanying drawings which illustrate various embodiments thereof. In these drawings.

Figure 1:
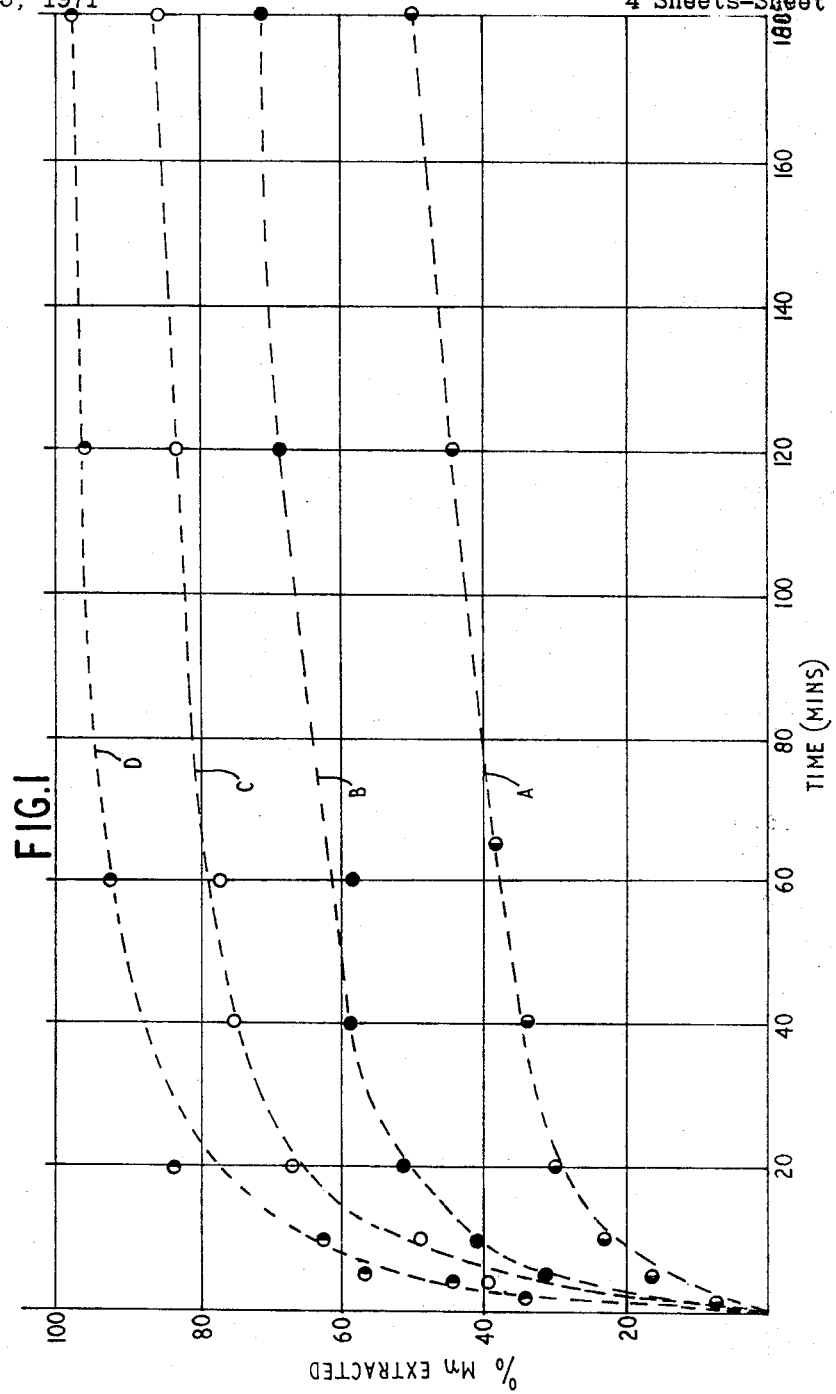
Figure 2:
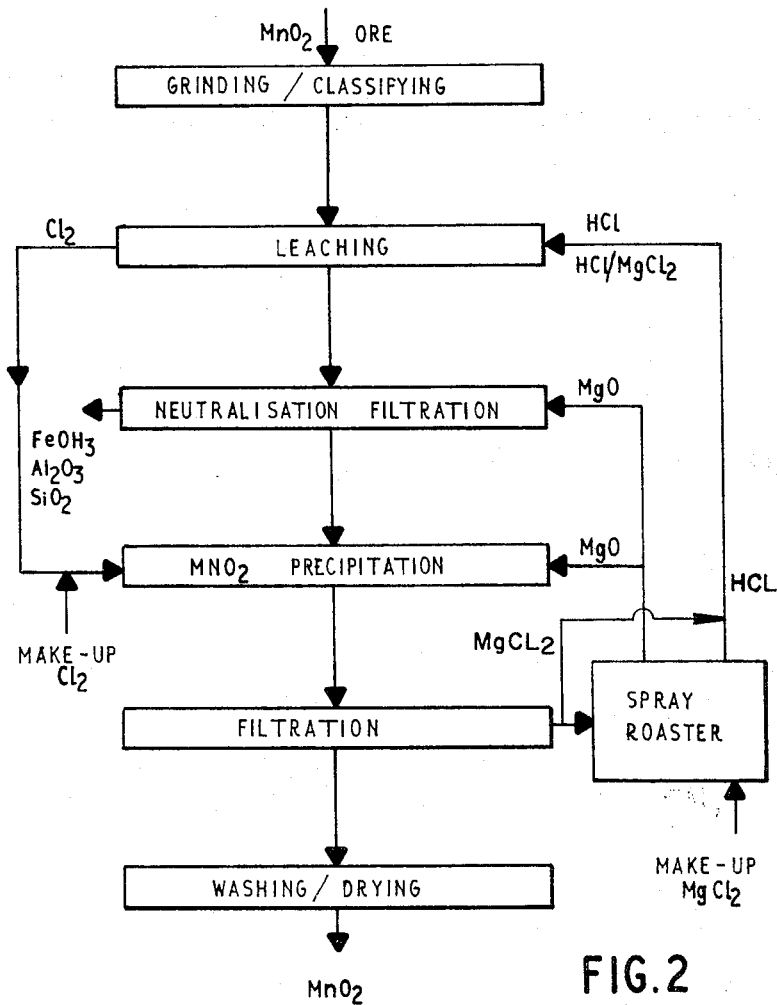
FIG. 2 is a flow sheet illustrating a cyclic process for the production of manganese dioxide using either hydrochloric acid or hydrochloric acid/magnesium chloride as leachant.

Referring to FIG. 2 the cyclic process therein illustrated comprises first grinding and classifying the starting manganese dioxide ore to reduce it to a suitable size, e.g. −30 +60 mesh (British Standard Sieve Series), for leaching. The ground ore is then leached with either hydrochloric acid or a mixture of hydrochloric acid and magnesium chloride produced in the spray roaster to produce a manganese chloride solution and chlorine. The chlorine produced in the leaching step is used, together with make-up chlorine, in the subsequent manganese dioxide precipitation step and the manganese chloride solution neutralised with magnesia to precipitate any impurities, such as iron, aluminium and silicon, contained therein. Any precipitates formed are removed by filtration and the manganese chloride solution is then treated with chlorine to precipitate manganese dioxide, with magnesia being added during the chlorine treatment to maintain the pH at a value above 0.5. As previously described, in the case where a high activity battery grade material is required, nuclei of carbon black or finely divided manganese dioxide can be added during the precipitation, or carbon black, in appropriate amounts, added under vigorous stirring to the precipitated manganese dioxide. The precipitated manganese dioxide is then filtered, washed and dried to obtain the desired end product, while the filtrate, together with make-up magnesium chloride, is spray roasted to regenerate the magnesia for use in the neutralisation and manganese dioxide precipitation steps, and also hydrochloric acid, or a hydrochloric acid/magnesium chloride mixture, for use in the leaching stage. In this way there is provided an overall process for the production of manganese dioxide, either for battery manufacture or for other uses, which has obvious economic advantages in that once the process is operating it requires little addition of chemicals and is therefore virtually self-supporting. This also means that the process could be operated away from sources of supply of such chemicals and could therefore be operated in remote areas, such as at the source of the manganese dioxide ore.

Whether or not a purification step will be required in this process will depend upon the grade or type of ore used as starting material and the requirements of the final product. As illustrated in FIG. 2 ferric ion may be precipitated as the insoluble hydroxide; this also assists in the removal of any heavy metal contaminants present. Where necessary, further removal of contaminants can be accomplished by either passing chlorine into the neutralised liquor to precipitate a small amount of manganese dioxide, which tends to collect ions deleterious to battery performance, or by a conventional sulphide purification step using, for example, hydrogen sulphide or manganous sulphide.

The use of magnesium chloride to increase the rate of leaching in the process of FIG. 2 is particularly advantageous since some of the input to the spray roaster may be used in the absorber of the spray roaster to thereby provide a hydrochloric acid/magnesium chloride solution for recirculation to the leaching stage.

Figure 3:
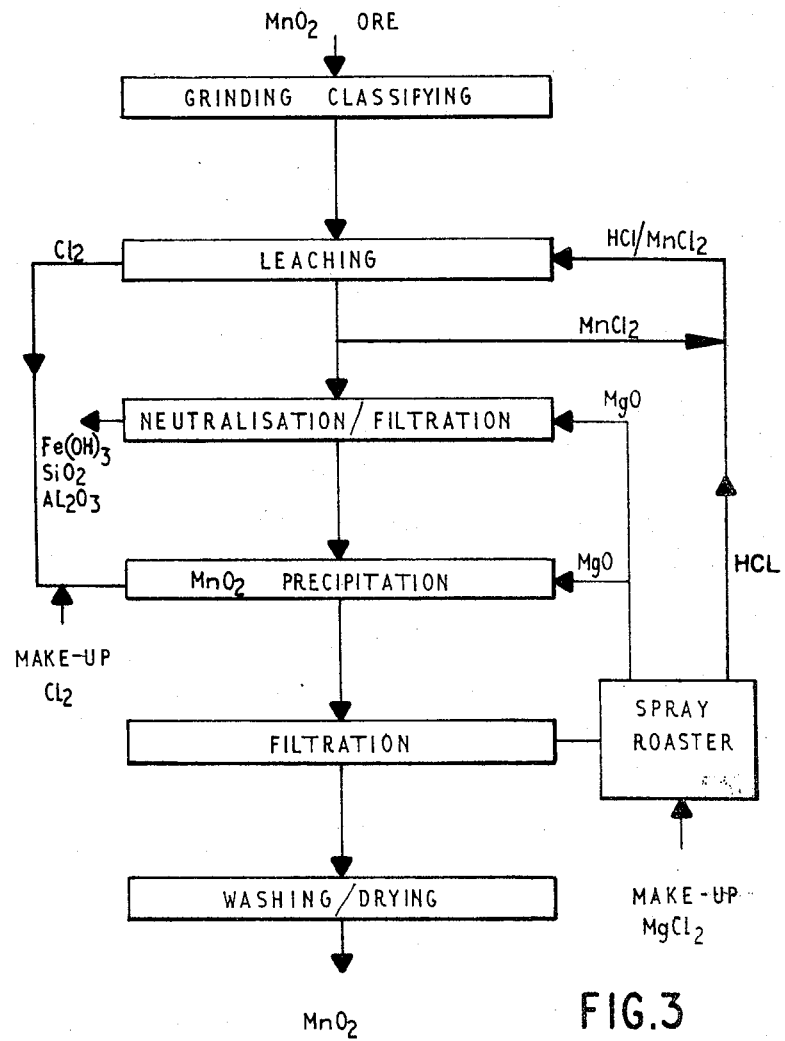
FIG. 3 is a flow sheet of a modification of the process of FIG. 2 wherein hydrochloric acid/manganese chloride is used as leachant.

FIG. 3 illustrates a modification of the process of FIG. 2 wherein leaching is carried out with a mixture of hydrochloric acid and manganese chloride instead of hydrochloric acid or a mixture of hydrochloric acid and magnesium chloride. In this modification, a portion of the manganese chloride solution resulting from the leaching stage is used in the absorber of the spray roaster to thereby provide a hydrochloric acid/manganese chloride solution for recirculation to the leaching stage, with the process otherwise being carried out in the same manner as that of FIG. 2. The recycling of hydrochloric acid and manganese chloride provides a viable alternative to a hydrochloric acid/magnesium chloride recycle and has the advantages of:

(a) increasing the leaching rate because of the favourable effect of the chloride ion on both the initial rate and the position of equilibrium, the inhibiting effect of the manganese ion being comparatively small;
(b) reducing the amount of hydrochloric acid, per unit of manganese dissolved, required to be neutralised after leaching;
(c) allowing manufacture of by-product manganese chloride with no magnesium chloride contamination; and
(d) providing a feed high in manganese concentration for the precipitation stage and thereby reducing the capital cost of the precipitators.

Figure 4:
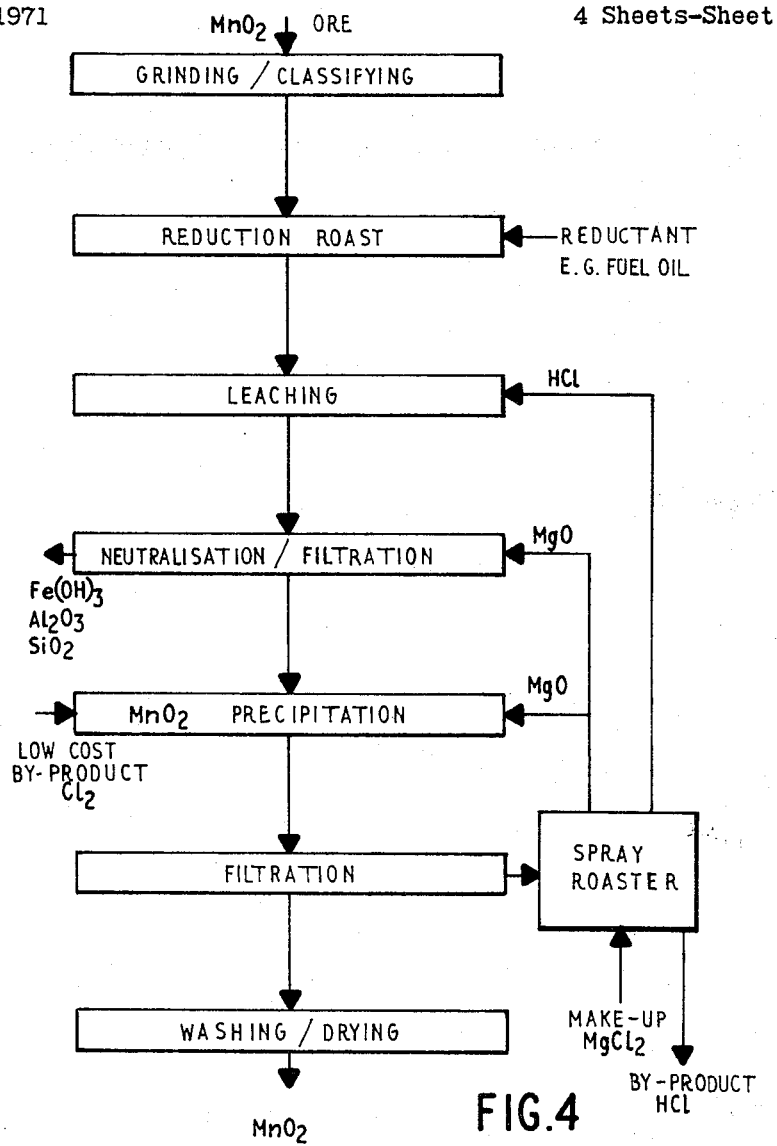
FIG. 4 is a flow sheet of another process for the production of manganese dioxide using low cost by-product chlorine.

The process illustrated in FIG. 4 is designed for use where low cost by-product chlorine is available. In this process, the manganese dioxide ore, after being ground and classified, is reduced to manganous oxide (MnO) in a reduction roast using a reductant such as fuel oil. The reduced ore is then leached with hydrochloric acid to produce a manganese chloride solution without the simultaneous production of chlorine. The manganese chloride solution is neutralised with magnesia, any impurities precipitated are filtered off, and then treated with low cost by-product chlorine to precipitate manganese dioxide with magnesia being added during the precipitation to control the pH of the solution. The precipitated manganese dioxide is then filtered, washed and dried to yield the desired end product. The filtrate, together with make-up magnesium chloride, is spray roasted to regenerate the magnesia, for use in the neutralisation and precipitation stages, and also hydrochloric acid for use in the leaching stage. In this case, by-product hydrochloric acid is also produced in the spray roasting stage.

Where manganous oxide is available, the reduction roast can be omitted from the process of FIG. 4. Thus, this process can be integrated with a plant producing manganese metal electrolytically, with manganous oxide and by-product chlorine from the manganese metal production being used in the manganese dioxide production, and the hydrochloric acid produced in the manganese dioxide process used as anolyte in the manganese metal process. Alternatively, the by-product hydrochloric acid from the manganese dioxide process could be marketed either in the form of the acid or as manganese chloride.

The present invention is further illustrated by means of the following examples.

EXAMPLE 1

The production of finely divided synthetic $MnO_2$

To a 110 litre glass reaction vessel, equipped with a pump action vortex stirrer and a water/steam coil for temperature control was added 40 litres of solution containing 189 g./l. $MnCl_2$ and 183 g./l. HCl. The stirrer was rotated at 200 r.p.m. and 4.4 kg. of $-14 +52$ mesh (British Standard Sieve Series) pyrolusite manganese ore (50% Mn) added. The solution temperature was programmed from 25° C. to reach 95° C. over a 1.5 hr. period. Heating rates from 0.6° C./min. to 1.0° C./min. were used to give uniform rates of chlorine evolution. The solution was held at 95° C. for 2 hrs. after which only small amounts of ore (less than 5%) remained unreacted. The solution contained 135 g./l. of manganese and 43 g./l. of hydrochloric acid.

The solution was purified by adding 40 g. of $H_2SO_4$ (as a 49 g./l. solution) to remove barium, and sufficient caustic magnesia (1.2 kg. as a 250 g. per litre $H_2O$ slurry) to increase the solution pH to 4.5 thereby removing iron and other impurities. The resulting slurry was filtered and the filtrate returned to the reactor.

The reactor temperature was controlled at 50 to 52° C. with a stirrer speed of 200 r.p.m., and chlorine was bubbled through the reactor at 0.75 kg./hr. The solution pH was controlled at 2.5 to 2.8 by addition of $Mg(OH)_2$ (as a 250 g./l. $H_2O$ slurry). The reaction was terminated when the manganese level fell to 4 g./l. This gave a run duration of 7 hrs. and a magnesium hydroxide consumption of 10.2. The total amount of chlorine passed was 6.4 kg. and 8.5 kg. of very finely divided $MnO_2$ was produced.

The product was filtered and dried and the filtrate, containing 58 g./l. magnesium (as the chloride), hydrolysed to yield magnesia and hydrochloric acid.

| | |
|---|---|
| Apparent density, g./cm.³ | 0.32 |
| Product analysis, w/o: | |
| Mn | 62.1 |
| $Mn^{4+}$ | 59.7 |
| $H_2O^{+110°\ C.}$ | 1.88 |
| $Mg^{2+}$ | 0.006 |
| Particle size, w/o: | |
| Less than 16.8 microns | 95 |
| Less than 10.5 microns | 60 |

EXAMPLE 2

The production of high battery activity $\gamma MnO_2$

To the reactor cited in Example 1, 40 litres of a solution containing 190 g./l. $MgCl_2$ and 146 g./l. HCl was added. 4.1 kg. of $-14 +52$ mesh (British Standard Sieve Series) manganese ore (34% Mn) was added to the reactor, the solution being stired at 150 r.p.m. The temperature was programmed from 20° C. to reach 100° C. after 50 minutes and then held at 95° C. for a further 20 minutes. The resulting solution contained 32 g./l. manganese and 59 g./l. HCl.

The solution was purified by adding 2.2 kg. of $Mg(OH)_2$, as a 110 g./l. slurry in water, to increase the solution pH to 5.5. This was filtered and the filtrate returned to the reactor.

70 g. of acetylene black, as a 2 w/o slurry in 18 g./l. HCl, was added. The solution temperature was controlled at 43 to 46° C. with a stirrer speed of 200 r.p.m. and chlorine bubbled through the solution at 0.6 kg./hr. After the solution had been saturated with chlorine, $Mg(OH)_2$, as a 110 g./l. slurry, was added to control the pH between 1.3 and 1.5. The reaction was terminated when the manganese level reached 0.5 g./l. (4 hours).

The consumption of magnesium hydroxide was 2.5 kg., the amount of chlorine passed was 2.4 kg. and 2.1 kg. of high battery activity manganese dioxide was produced. The final filtrate, containing 48 g./l. magnesium as the chloride was hydrolysed to yield magnesia and hydrochloric acid.

| | |
|---|---|
| Crystal structure | Gamma |
| Product analysis, w/o: | |
| Mn | 59.8 |
| $Mn^{4+}$ | 57.4 |
| C | 3.4 |

| | |
|---|---|
| $H_2O^{+100°\ C.}$ | 2.1 w/o. |
| $Mg^{2+}$ | 0.01 w/o. |
| Average particle size ($d_n$) (Coulter counter) | 3.1 microns. |

Kornfeil Test Results:

| | Time to discharge to 1.0 v. (sec.) | |
|---|---|---|
| Material | 50 mA./cm.² | 10 mA./cm.² |
| Product | 7,500 | 59,000 |
| Commercial battery grade: | | |
| (a) Electrolytic | 7,100 | 45,800 |
| (b) Chemical | 6,300 | 44,600 |

What we claim is:
1. A cyclic process for preparing synthetic manganese dioxide which comprises the steps of:
   (A) leaching at a temperature in the range of room temperature to the boiling point of the solution a manganese dioxide ore with hydrochloric acid containing at least one member of the group consisting of manganese chloride and magnesium chloride in an amount sufficient to increase the rate of leaching to convert the manganese content of said ore to manganese chloride, and simultaneously produce chlorine,
   (B) adding a base of a metal selected from the group consisting of manganese and magnesium to the solution obtained in step (A) to neutralize unreacted hydrochloric acid and thereby to precipitate deleterious impurities from said solution;
   (C) treating said solution with chlorine at least a part of which has been obtained in step (A) while maintaining the pH thereof at a value of about 0.5 to 3 by addition of a base selected from the group consisting of magnesium oxide and magnesium hydroxide to thereby precipitate manganese dioxide;
   (D) separating the precipitated manganese dioxide from the liquid phase; and

(E) subjecting the liquid phase from step (D) to a hydrolysis reaction at a temperature of at least 400° C. to regenerate the base used in steps (B) and (C) and the hydrochloric acid used in step (A), the regenerated base being recirculated for use in steps (B) and (C) and the regenerated hydrochloric acid recirculated for use in step (A).

2. The process according to claim 1, characterized in that at least a portion of the solution produced in step (A) is mixed with the hydrochloric acid produced in step (E) to produce at least a part of the solution used for leaching the manganese dioxide ore in step (A).

3. The process according to claim 1, characterized in that the precipitation of said manganese dioxide in step (C) is carried out in the presence of nuclei selected from the group consisting of acetylene black and finely divided manganese dioxide to thereby produce a product of high battery activity.

4. The process according to claim 3, characterized in that acetylene black is added under vigorous stirring to the manganese dioxide precipitated in step (C) to thereby produce a mixture of acetylene black and manganese dioxide suitable for use in dry cells.

5. The process according to claim 1, characterized in that at least a portion of the solution produced in step (D) is mixed with the hydrochloric acid produced in step (E) to form at least a part of the solution used for leaching the $MnO_2$ ore in step (A).

6. The process according to claim 1 characterized in that the leaching in step (A) is at a temperature of from about 50° C. to about 100° C.

References Cited

UNITED STATES PATENTS

| | | | |
|---|---|---|---|
| 1,103,258 | 7/1914 | Brackelsberg | 75—111 |
| 2,954,277 | 9/1960 | Thomsen | 423—481 |
| 3,414,440 | 12/1968 | Moore | 252—520 |
| 2,804,375 | 8/1957 | Kamlet | 23—154 |
| 1,327,536 | 1/1920 | Elliott | 23—154 |
| 3,414,440 | 12/1968 | Moore | 23—145 |
| 2,204,888 | 6/1940 | Dougherty | 23—145 |

OSCAR R. VERTIZ, Primary Examiner

H. S. MILLER, Assistant Examiner

U.S. Cl. X.R.

75—111; 252—502; 423—605